United States Patent [19]

Golestaneh

[11] 4,302,939

[45] Dec. 1, 1981

[54] SOLID STATE ENGINE USING NITINOL MEMORY ALLOY

[75] Inventor: Ahmad A. Golestaneh, Bolingbrook, Ill.

[73] Assignee: The United States of America as represented by the United States Department of Energy, Washington, D.C.

[21] Appl. No.: 114,134

[22] Filed: Jan. 21, 1980

[51] Int. Cl.³ .............................................. F03G 7/06
[52] U.S. Cl. .................................................... 60/527
[58] Field of Search .......................... 60/527, 528, 529

[56] References Cited

U.S. PATENT DOCUMENTS 3,665,705  5/1972  Christensen ........................... 60/527
3,830,060  8/1974  Jedlicka et al. ........................ 60/527

OTHER PUBLICATIONS

Golestaneh, "Efficiency of the Solid-State Engine made with Nitinol Memory Material", *Journal Applied Physics*, 49(3), Mar. 1978.

Wang and Buehler, "Additional Unique Property Changes Observed During TiNi Transition", *Applied Physics Letter*, vol. 21, No. 3, Aug. 1972.

*Primary Examiner*—Allen M. Ostrager
*Attorney, Agent, or Firm*—Hugh W. Glenn; Arthur A. Churm; Richard G. Besha

[57] ABSTRACT

A device for converting heat energy to mechanical energy includes a reservoir of a hot fluid and a rotor assembly mounted thereabove so a portion of it dips into the hot fluid. The rotor assembly may include a shaft having four spokes extending radially outwardly therefrom at right angles to each other, a floating ring and four flexible elements composed of a thermal memory material having a critical temperature between the temperature of the hot fluid and that of the ambient atmosphere extending between the ends of the spokes and the floating ring. Preferably, the flexible elements are attached to the floating ring through curved leaf springs. Energetic shape recovery of the flexible elements in the hot fluid causes the rotor assembly to rotate.

17 Claims, 3 Drawing Figures

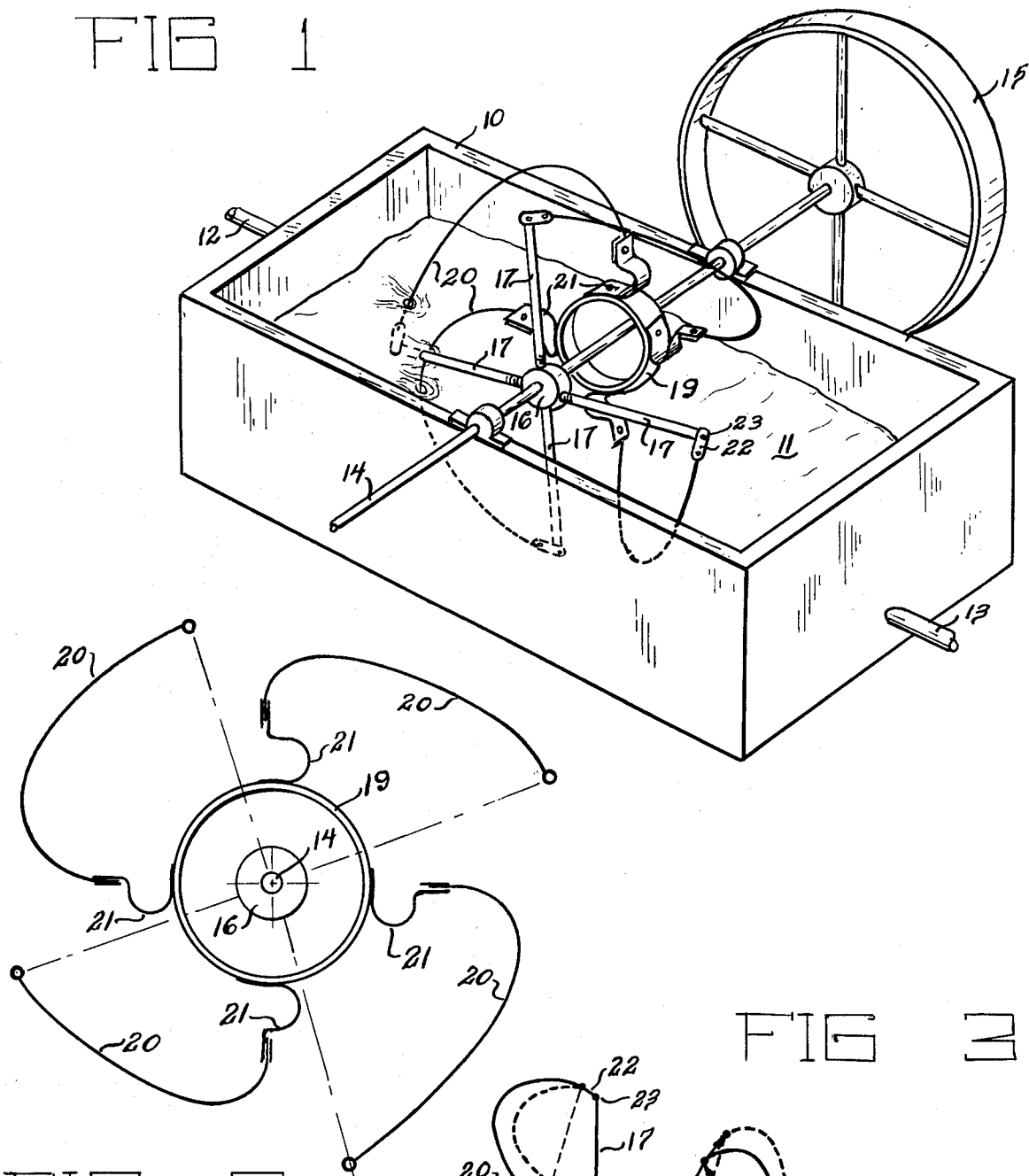

SOLID STATE ENGINE USING NITINOL MEMORY ALLOY

CONTRACTUAL ORIGIN OF THE INVENTION

The invention described herein was made in the course of, or under, a contract with the UNITED STATES DEPARTMENT OF ENERGY.

CROSS REFERENCE TO RELATED APPLICATIONS

This application is closely related to applicant's co-pending application Ser. No. 113,868 filed concurrently herewith.

BACKGROUND OF THE INVENTION

This invention relates to a device for converting heat energy to mechanical energy.

In more detail the invention relates to a device that utilizes a shape-memory material to convert low temperature thermal energy to mechanical energy.

Sources of low-grade heat frequently exist at the site at which a demand exists for low-grade energy. For example, homes, farms, factories, office buildings, hotels, and the like frequently have a constant supply of hot water available, not all of which is utilized for its intended purpose. In addition, the waste heat of industrial, farm or home equipment may be economically utilized to heat water to a low temperature. Furthermore, it can confidently be predicted that low-grade heat in the form of hot water will in the near future be economically available almost everywhere from solar power. In general, this water is not hot enough to drive a turbine or use in any conventional type of energy-generating equipment.

Frequently, the energy demand may be for relatively low-power energy, either constant or constantly available even if not required constantly. Among the small-scale—and yet important—applications envisioned for heat engines working at low temperatures across a small $\Delta T$ to produce a limited but significant amount of power are devices designed to orient solar apparatus, to regulate thermal heat control and as a thermal safety valve. Despite the limitations imposed on low-temperature heat engines, sources of low-grade heat are so wide spaced and available that utilization of a small fraction thereof could have a significant impact on the world energy supply.

Low-temperature energy conversion utilizing heat engines based on the energetic shape recovery of a deformed thermoelastic material—called a shape-memory material—have been extensively investigated. These "memory materials" are capable of undergoing a martensitic transition with the ability of the alloys to undergo such a transition being both temperature and stress dependent. The temperature range at which this transition can occur is hereinafter called the critical temperature and is characteristic of the particular alloy under consideration. At temperatures below their critical temperatures, these alloys are relatively soft and pliable. Annealed at a temperature above its critical temperature in a given shape (hereinafter designated the "heat-treated configuration") and deformed into a "trained configuration" at a temperature below that critical temperature, such an alloy will revert back to its trained configuration when heated to or above its critical temperature. The process is called shape-recovery since the alloy element will move in a direction opposite to the direction in which it had been deformed and in so doing will recover its trained shape. This recovery is found to occur with some force supplied by a part of the martensitic latent heat of transformation which is about 2 cal/g. Experimentally it is found that the portion of this thermal energy which can be converted to the mechanical energy is about 0.16, and the Nitinol engine efficiency cannot exceed 5%. These memory materials are produced in the forms of wires, rods, foils, plates, tubes, springs, etc., and with wide ranges of temperature responsiveness which is a function of alloy composition and production history. For example, memory materials are available that possess critical temperatures in the range of from $-150°$ C. to $+150°$ C. The alloys of one such series, referred to as 55-Nitinol, have chemical compositions in the range from about 53 to about 57 weight percent nickel, balance titanium, and are based on the intermetallic compound NiTi. Descriptions of these and other titanium-based memory materials are given in U.S. Pat. Nos. 3,174,851 (W. J. Buehler et al, "Nickel-Base Alloys," Mar. 23, 1965); 3,403,238 (W. J. Buehler et al, "Conversion of Heat Energy to Mechanical Energy," Sept. 24, 1968); and 3,558,369 (F. E. Wang et al, "Method of Treating Variable Transition Temperature Alloys," Jan. 26, 1971).

These alloys have found practical application in a number of different areas such as control devices and medical instruments. A wide variety of heat engines employing the alloys have also been proposed. A partial list of patents directed to such devices follows:

U.S. Pat. No. 3,913,326—Banks—Oct. 21, 1975
U.S. Pat. No. 4,027,479—Cory—May 6, 1976
U.S. Pat. No. 4,086,769—Smith—May 2, 1978
U.S. Pat. No. 4,087,971—Hart—May 9, 1978

The following publications also describe such devices.

Science Magazine, Vol. 191, Mar. 5, 1976, pages 934–6.

Intersociety Energy Conversion Conference, 1975 record, pages 530–4.

Scientific American, Apr. 1971, pages 118–122.

A heat engine somewhat similar to that described herein is disclosed in Acta Metallurgica, Vol. 25, page 1320. In this device an inch of leaf-spring, an inch of NiTi wire, a three-inch rod, another inch of NiTi wire and another inch of leaf-spring in the same plane as the first are joined in a straight line. This assembly is bent into an S-shape and the outer ends of the leaf-springs are fixed into slots in two pieces of metal mounted four inches apart on an axle. The axle rests across a dish of hot water. When either NiTi bend dips into the water, it stiffens and straightens a little. This increases the bend of the other and displaces the center of gravity of the whole assembly so that it rocks over and dips the cold NiTi bend into the water in its turn. The assembly rocks at about two strokes per second so long as the water is above the transformation temperature. An excellent recent discussion of shape-memory alloys and uses thereof appears in Scientific American, November 1979, pages 74–82.

Although these and numerous other approaches have been proposed and utilized to provide thermally driven motive power sources, most prior art devices have been so mechanically complicated or grossly inefficient as to be impractical.

It is accordingly the object of the invention to provide a thermal engine which is mechanically simple and operationally feasible for certain applications.

It is another object of the present invention to provide a thermal engine which is capable of carrying a load adequate to perform useful work.

It is still another object of the present invention to provide a thermal engine which is capable of scale-up in power developed by the simple addition of units.

SUMMARY OF THE INVENTION

A device for converting heat energy to mechanical energy includes a reservoir of hot water and a rotor assembly mounted thereabove so a portion of it dips into the hot water. The rotor assembly may include a shaft having four spokes extending radially outwardly therefrom at right angles to each other, a floating ring and four flexible elements composed of a shape-memory material having a critical temperature between the temperature of the hot water and that of the ambient atmosphere extending between the ends of the spokes and the floating ring. Preferably, the flexible elements are attached to the floating ring through curved leaf springs. Energetic shape-recovery of the elements in the hot water causes the rotor assembly to rotate.

BRIEF DESCRIPTION OF THE DRAWINGS

FIG. 1 is an isometric view of a heat engine employing a thermal memory material constructed in accordance with the present invention, FIG. 2 is a sketch showing how the shape-memory elements are attached to the floating ring, and FIG. 3 includes a force diagram superimposed on the rotor assembly of the heat engine showing motion of the floating ring.

DESCRIPTION OF THE PREFERRED EMBODIMENT

Referring now to FIG. 1, an open-top container 10 is supplied with a fluid 11—such as water—at a temperature above ambient through conduit 12 and is discharged through conduit 13. This water constitutes the hot reservoir of the device, the ambient atmosphere constituting the cold reservoir. A shaft 14, having a flywheel 15 at one end thereof to smooth out operation of the device is rotatably supported on top of container 10. As is evident, a conventional power takeoff can also be connected to shaft 14.

As is also shown in FIG. 1, a hub 16 is fixedly attached to shaft 14 to rotate therewith and four radial spokes 17 extend outwardly therefrom at right angles to dip into the water in container 10 on rotation of shaft 14. Since operation of this device is gravity related, shaft 14 must be horizontal and spokes 17 vertical with respect to the water in container 10. A floating ring 19 of diameter less than that of the circle formed by the tips of spokes 17 is not attached to shaft 14 but encircles it. Floating ring 19 is attached to and supported from spokes 17 by four arcuate Nitinol wires 20 of the same length which are connected axially and rigidly through curved leaf springs 21 to floating ring 19 and to connectors 22 attached to spokes 17 by screws 23 passing at right angles therethrough. While the Nitinol wires are always fixed to the floating ring they are fixed to the spokes only when an intermediate spring is employed. Otherwise this connection should be free for rotation. As shown, the wires are fixedly attached to the spokes by screws 23; however, loosening of screws 23 would enable the wires to swing in a plane parallel to that of the spokes about the point of attachment. The device could then be operated without springs 21. Connectors 22 are formed of Teflon to resist corrosion while being of low weight. Wires 20 may be glued or soldered in place in the connectors. Floating ring 19 is supported by wires 20 and rotates eccentrically around the engine shaft.

Wires 20 dip into the water the minimum extent necessary to accomplish shape recovery to obtain maximum time in the cold reservoir. Optimum depth of the hot water is such that at the point of maximum immersion the wires are completely immersed but the leaf springs 21 are not in the water at all.

While this device is operable without springs 21, incorporation of these springs in the device has two results. In the first place, energy stored in the springs when the Nitinol wires are in the hot reservoir is utilized in the cold reservoir to deform the wires. In the second place, the springs add flexibility to the wire junctions and thus increase the fatigue life of the wire elements.

In FIG. 3, $F_1$ is the force applied to the floating ring by one Nitinol wire engaging in shape recovery, $F_2$ is the force applied to the floating ring by the other Nitinol wire engaging in shape recovery, $F_S$ is the resultant force, E is the eccentricity of the center of mass of the floating ring and P is the gravitational force on the floating ring.

Nitinol wire elements are bent to the desired curved shape and then are "trained" in this shape by maintaining them at about 530° C. for about 15 minutes and cooling them in this same shape. The reason for using an element bent into the desired curved shape is to ensure a unique direction for deformation of the wires and to reduce the force required for deformation. For effective shape-recovery utilization Nitinol wires 20 must be connected radially to floating ring 19 to obtain complete symmetry and experience has shown that the span of each Nitinol element must form an angle of about 20° with the tangent to the floating ring. Direction of rotation depends on whether this angle is positive or negative. Also the deformation strain in the element must not exceed 2–5%. Otherwise the shape-recovery will become incomplete after a few cycles and the elements are now damaged.

This device operates on the basis of the continuous unbalancing of the center of mass of a rotating system incorporating shape-memory elements. Shape-recovery forces created in the wire elements in the hot reservoir displace a floating ring, shifting the center of mass of the system and providing a gravity torque for turning a shaft while deforming the remaining wire elements in a cold reservoir.

After assembly, all that need be done to operate the engine is to supply water at a temperature above the critical temperature of the Nitinol elements to container 10. Nitinol wires 20 within the hot reservoir engage in energetic shape-recovery, pushing floating ring 19 off center with respect to shaft 14. The net effect of the energetic shape-recovery of the Nitinol elements is to shift the center of mass of the system to one side of the axis of rotation of the device, creating a gravity torque which rotates the engine. As each wire enters the hot reservoir it engages in the same transformation. When a Nitinol element leaves the hot reservoir, it cools off rapidly to below the critical temperature and becomes soft. Hence the force of shape-recovery of those elements in the hot reservoir can easily deform those elements in the cold reservoir and thereby make them ready for shape-recovery again. The heat energy which causes the Nitinol elements to revert back to their original shape is converted to mechanical energy and the mechanical energy thus developed far exceeds the mechanical energy necessary to deform the Nitinol elements. The excess mechanical energy is available to turn the rotor.

A device constructed in accordance with this invention was built and has been operated. This device employs four Nitinol wires 0.75 mm in diameter and 80 mm in length arcuately connected between the spokes and the floating ring. Floating ring 19 is a thin bronze band, 1½" in diameter and 60 g in weight. Spokes 17 are ½" stainless steel, the distance between the center of the shaft to the end of the spokes being 2.7 inches. An available Nitinol alloy having a critical temperature of 33° C.±7° C. was used to make the wires. The engine weighs 160 grams and, with a 200 gram flywheel, has a maximum engine speed of 52 R.P.M. when working between a cold reservoir temperature of 24° C. and a hot reservoir temperature of 75° C. This device employed helical springs rather than the leaf springs shown in the drawing. These helical springs were 4 mm in diameter, wire size being 0.75 mm diameter.

This device was a miniature model built for demonstration purposes, developing a few milliwatts of power. Subsequently, a device including 1-mm Nitinol wire elements connected to the floating ring by leaf springs was built and operated. The leaf springs were 6 mm wide and 0.25 mm thick. The power of the engine was thereby increased tenfold. The engine ran at a hot reservoir temperature of 36° C. which is only 3 degrees above the wire's shape-recovery temperature.

Larger devices producing up to a few watts of power can easily be built by

1. Increasing the temperature difference between the hot reservoir—up to, say, 75° C.—and the cold reservoir.
2. Increasing the wire diameter up to 1 mm or a little more—because heat exchange rate is limited, one cannot use thick wire.
3. Choosing the lightest possible floating ring depending on the wire diameter and strength.
4. Multiplying the number of separate units on a single shaft or increasing the number of elements within a unit.
5. Decreasing the height of the curved wire elements suitably (say ¼ of the span of the wire).
6. Employing a Nitinol alloy with the optimum critical temperature—about 47° C., if the cold reservoir has a temperature of, say, 24° C.

It will be noted that the specific embodiment of the invention described above employs four Nitinol wires in each unit, which is a minimum number that can ensure a smooth rotation of the engine. (Note that rotation can be obtained using only two wires but operation will be very jerky.) A preliminary test on an engine having eight wires showed that engine power per unit of floating ring weight was a little less than that of an engine operating with two separate units of four wires each on the shaft, but this was found to be due to poor adjustment of the wire orientations; in principle, a unit with 8, 16, or more wires is well feasible. In fact, 8 wires may be desirable to hold the floating ring away from the spokes 17. Tests have also shown that wires heavier than those mentioned above will not engage in energetic shape-recovery to the extent required and lighter wires are not strong enough. Length of the wires is not critical insofar as operability is concerned. The optimum length is best determined by trial and error. It is clear that wires that are too long should not be used since the ends of the wires cannot be effectively deformed and engaged in energetic shape-recovery. In general, the ratio of the height to span of the curved wire should be about ⅛ to ¼.

Preferably a Nitinol alloy having a critical temperature of 30°–50° C. should be used, if the engine must operate between a cold reservoir (air) temperature of 20°–24° C. and a hot reservoir temperature of 50°–100° C. While a binary alloy was employed in the specific embodiment described above, it is probable that ternary alloys will best be used in the future, because the shape-recovery critical temperature in these alloys depends less sensitively on small variations of the alloy composition. For instance, one such alloy is Nitinol with less than 1% Zr in place of an equal amount of nickel.

Water is, of course, the fluid of choice for the hot reservoir. Other fluids such as oil or hot air could be used in specialized situations. It has been noted that movement of air over the engine increases the engine speed, because it increases the heat exchange rate.

As to the weight and radius of the floating ring, it may be recalled that the function of the floating ring is not only to deform the shape-recovery elements in the cold reservoir but also to create a moment about the central axis of the engine due to its weight and the displacement of its center from the center axis of the engine. Optimum size and weight for the floating ring must be established by trial and error to obtain the best kinetics for a particular wire size. It can be shown that the power of the engine does not increase proportionately to the weight and two units operating in series (i.e. on a single shaft) provide more power than the same two units in parallel. In particular the revolutionary speed of the engine is essentially controlled by the rate of the martensitic reaction and not much by the number of unit or wire elements.

The embodiments of the invention in which an exclusive property or privilege is claimed are defined as follows:

1. A device for converting heat energy to mechanical energy comprising:
    a reservoir of fluid and
    a rotor assembly including
    a shaft,
    a floating ring encircling the shaft and
    a plurality of arcuate flexible elements composed of a shape-memory material having a critical temperature below that of the fluid temperature connecting the shaft and the floating ring disposed symmetrically about the rotor assembly so as to dip into the water on rotation of the rotor assembly,
    whereby energetic shape recovery of the thermal memory material in the reservoir displaces the center of mass of the rotor assembly to one side of the axis of rotation thereof so that the force of gravity acting on the floating ring causes the rotor assembly to turn and simultaneously deforms those arcuate elements in the atmosphere, readying them for further energetic shape recovery upon further rotation into the reservoir.

2. Device according to claim 1 wherein the shape memory material is a binary alloy of nickel and titanium or a ternary alloy of nickel, titanium and not more than 1% of zirconium or cobalt which has a shape-recovery critical temperature of 30°–50° C.

3. Device according to claim 2 wherein four spokes extend radially outwardly at right angles from the shaft, four wires connecting the ends thereof with the floating ring.

4. Device according to claim 3 wherein the shape-memory elements are connected to the floating ring through springs.

5. Device according to claim 4 wherein said springs are leaf springs.

6. Device according to claim 5 wherein the span of each wire forms an angle of about 20° with respect to the tangent to the floating ring at the point of connection.

7. Device according to claim 6 and including a flywheel on the shaft.

8. Device according to claim 7 wherein the wires are 1.0 mm in diameter and 80 mm in length.

9. Device according to claim 1 wherein an even number of arcuate flexible elements are provided.

10. Device according to claim 1 wherein said reservoir contains hot fluid at a temperature above that of the ambient atmosphere and said shape memory material has a critical temperature between that of the hot fluid and the ambient atmosphere.

11. A device for converting heat energy of a fluid to mechanical energy comprising:
a rotor assembly including a horizontal shaft, a plurality of spokes radiating from said shaft, a floating ring encircling said shaft at a location along its length spaced from said spokes, a plurality of arcuate flexible elements connecting said spokes to spaced points of attachment around said ring for support of said ring, said elements comprising a shape memory material having a critical temperature above which internal shape recovery forces are generated within said element,
a reservoir of fluid at a temperature above the critical temperature of the shape memory material;
said rotor assembly supported in respect to said reservoir such that a portion thereof including a fraction of said elements is immersed in said fluid at above the critical temperature to force said ring off center respecting said shaft as the shape memory material undergoes shape recovery and such that a portion thereof including a fraction of said elements are withdrawn from said fluid to permit deformation of said shape memory material at a temperature below the critical temperature whereby rotation is imparted to the rotor assembly.

12. The device of claim 11 wherein each of said flexible elements comprises:
a wire of shape memory material connected at one end to a distal portion of one of said spokes and a leaf spring interconnecting the opposite end of said wire to an outer curved surface of said ring.

13. The device of claim 12 wherein said rotor assembly is supported in respect to said reservoir such that each wire of shape memory material becomes fully immersed within the fluid without immersing the interconnecting leaf spring as the assembly rotates.

14. The device of claim 11 wherein said spokes are equally spaced about the shaft circumference and said points of attachment of flexible elements to the ring are equally spaced about the circumference of the ring.

15. The device of claim 11 wherein said flexible elements recover towards less arcuation while immersed in said fluid and deform towards more arcuation while withdrawn from said fluid.

16. The device of claim 11 wherein said flexible elements withdrawn from said fluid are exposed to air at a temperature below the critical temperature of the shape memory material.

17. The device of claim 11 wherein the circumference defined by distal ends of said spokes is larger than the outer circumference of said ring.

* * * * *